(12) United States Patent
Coppin

(10) Patent No.: US 9,678,584 B2
(45) Date of Patent: Jun. 13, 2017

(54) DEVICE INCLUDING ELECTRODE HAVING THICKNESS TO FACILITATE TRACKING

(71) Applicant: Microsoft Technology Licensing, LLC, Redmond, WA (US)

(72) Inventor: Justin A. Coppin, Windsor, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/679,391

(22) Filed: Apr. 6, 2015

(65) Prior Publication Data

US 2016/0291707 A1 Oct. 6, 2016

(51) Int. Cl.
 *G06F 3/0354* (2013.01)
 *G06F 3/041* (2006.01)
 *G06F 3/044* (2006.01)

(52) U.S. Cl.
 CPC .......... *G06F 3/03545* (2013.01); *G06F 3/044* (2013.01); *G06F 3/0412* (2013.01); *G06F 3/0416* (2013.01); *G06F 2203/04104* (2013.01); *G06F 2203/04112* (2013.01)

(58) Field of Classification Search
 CPC .... G06F 3/033; G06F 3/0354; G06F 3/03545; G06F 3/03546; G06F 3/0412; G06F 3/0416; G06F 3/044; G06F 3/047; G06F 3/048; G06F 3/0484–3/04847; G06F 3/0487–3/04886; G06F 2203/04104; G06F 2203/04112
 See application file for complete search history.

(56) References Cited

U.S. PATENT DOCUMENTS

| | | | |
|---|---|---|---|
| 3,873,770 A | 3/1975 | Ioannou | |
| 4,670,751 A | 6/1987 | Enokido et al. | |
| 5,198,623 A | 3/1993 | Landmeier | |
| 5,414,227 A | 5/1995 | Schubert et al. | |
| 5,736,980 A * | 4/1998 | Iguchi | G06F 3/03545 345/179 |
| 6,331,884 B1 | 12/2001 | Masazumi et al. | |
| 6,778,167 B2 | 8/2004 | Ohashi | |

(Continued)

FOREIGN PATENT DOCUMENTS

JP 59135580 A 8/1984

OTHER PUBLICATIONS

Haran, ON, "Technologies and Requirements for Digital Pens", Retrieved on: Jan. 19, 2015 Available at: http://informationdisplay.org/IDArchive/2014/JulyAugust/FrontlineTechnologyDigitalPens.aspx, 8 pages.

(Continued)

*Primary Examiner* — Nathan Danielsen
(74) *Attorney, Agent, or Firm* — Wade IP Law LLC

(57) ABSTRACT

Devices are described herein that include an electrode having a thickness to, among other things, facilitate tracking. For example, the thickness of an electrode that is included in a device may be configured to cause a midpoint of a projection of the electrode on a sensor matrix to track a point on the device (or on a portion thereof, such as the electrode) that is closest to the sensor matrix. In another example, the thickness may be configured to cause a location of the electrode that is detected by the sensor matrix to track a point on the device (or on a portion thereof, such as the electrode) that is closest to the sensor matrix.

20 Claims, 7 Drawing Sheets

(56) References Cited

U.S. PATENT DOCUMENTS

| | | |
|---|---|---|
| 6,850,230 B1 | 2/2005 | Vincent et al. |
| 8,243,028 B2 | 8/2012 | Hildebrandt et al. |
| 2001/0033274 A1 | 10/2001 | Ong |
| 2007/0188480 A1 | 8/2007 | Teng et al. |
| 2012/0037433 A1 | 2/2012 | Yeh et al. |
| 2012/0327042 A1 | 12/2012 | Harley et al. |
| 2013/0194242 A1* | 8/2013 | Park .................... G06F 3/03545 345/179 |
| 2013/0201162 A1 | 8/2013 | Cavilia |
| 2013/0278550 A1 | 10/2013 | Westhues |
| 2014/0002422 A1* | 1/2014 | Stern ................... G06F 3/03545 345/179 |
| 2014/0028577 A1 | 1/2014 | Krah et al. |
| 2014/0062966 A1* | 3/2014 | Szymanski ......... G06F 3/03545 345/179 |

OTHER PUBLICATIONS

"International Search Report & Written Opinion Issued in PCT Application No. PCT/US2016/024593", Mailed Date: Jun. 15, 2016, 13 Pages.

"Second Written Opinion Issued in PCT Application No. PCT/US2016/024593", Mailed Date: Mar. 15, 2017, 7 Pages.

* cited by examiner

DEVICE INCLUDING ELECTRODE HAVING THICKNESS TO FACILITATE TRACKING

BACKGROUND

Computing devices (e.g., tablet computers, personal digital assistants) often include touch screens that enable the computing devices to detect touch commands and/or hover commands. For instance, a touch screen may include any of a variety of materials that are responsive to resistance, capacitance, and/or light for enabling detection of such commands. A touch screen usually includes a sensor matrix, which includes an array of row sensors and an array of column sensors. Each of the sensors in the arrays is typically configured to detect an object when the object is placed within a certain proximity to the sensor. For instance, an amount of resistance, capacitance, and/or light detected by the sensor may indicate whether the object is proximate the sensor. A location of the object with respect to the touch screen may be determined based on the amount(s) of resistance, capacitance, and/or light that are detected by one or more of the sensors.

A stylus is an object that is commonly used to provide input to a touch screen. For instance, the stylus may be used to write a message on the touch screen and/or to select icons that are displayed on the touch screen. It is desirable for a detected location of the stylus to be as close as possible to the physical location at which the stylus is touching the touch screen or being used to point at the touch screen. However, in practice, the detected location differs from the physical location, and the difference (referred to as the position error) typically increases when the stylus is tilted from a position that is normal (i.e., perpendicular) to the touch screen.

SUMMARY

Various devices are described herein that include an electrode having a thickness to, among other things, facilitate tracking. For example, the thickness of an electrode that is included in a device may be configured to cause a midpoint of a projection of the electrode on a sensor matrix to track a point on the device (or on a portion thereof, such as the electrode) that is closest to the sensor matrix. In another example, the thickness may be configured to cause a location of the electrode that is detected by the sensor matrix to track a point on the device (or on a portion thereof, such as the electrode) that is closest to the sensor matrix.

A first example device includes a member and an electrode. The member has a proximal end and a distal end at opposing ends of an axis. The electrode is positioned at a designated end of the member. The designated end is the proximal end or the distal end. The electrode is configured to provide a signal to a sensor matrix of a computing device in response to the electrode being placed proximate the sensor matrix. The electrode has a thickness along the axis. The thickness is configured to cause a midpoint of a projection of the electrode on the sensor matrix to track a point on the electrode or on the device as a whole that is closest to the sensor matrix as the member is rotated from a first position in which the member is orthogonal to the sensor matrix to a second position in which the member is non-orthogonal to the sensor matrix.

A second example device includes a member and an electrode. The member has a proximal end and a distal end at opposing ends of an axis. The electrode is positioned at a designated end of the member. The designated end is the proximal end or the distal end. The electrode is configured to provide a signal to a sensor matrix of a computing device in response to the electrode being placed proximate the sensor matrix. The electrode has a thickness along the axis. The thickness is configured to cause a location of the electrode that is detected by the sensor matrix to track a point on the electrode or on the device as a whole that is closest to the sensor matrix as the member is rotated from a first position in which the member is orthogonal to the sensor matrix to a second position in which the member is non-orthogonal to the sensor matrix.

A third example device includes an elongated member, a driver circuit, and a module. The elongated member extends along an axis. The driver circuit is configured to generate an active signal. The module is coupled to an end of the elongated member. The module includes an electrode that is configured to provide the active signal electrostatically to a sensor matrix of a computing device. The electrode has a thickness along the axis. The thickness is configured to cause a midpoint of a projection of the electrode on the sensor matrix to track a point on the electrode, on the module, or on the device as a whole that is closest to the sensor matrix as the elongated member is rotated from a first position in which the elongated member is orthogonal to the sensor matrix to a second position in which the elongated member is non-orthogonal to the sensor matrix.

A fourth example device includes an elongated member, a driver circuit, and a module. The elongated member extends along an axis. The driver circuit is configured to generate an active signal. The module is coupled to an end of the elongated member. The module includes an electrode that is configured to provide the active signal electrostatically to a sensor matrix of a computing device. The electrode has a thickness along the axis. The thickness is configured to cause a location of the module that is detected by the sensor matrix to track a point on the electrode, on the module, or on the device as a whole that is closest to the sensor matrix as the elongated member is rotated from a first position in which the elongated member is orthogonal to the sensor matrix to a second position in which the elongated member is non-orthogonal to the sensor matrix.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
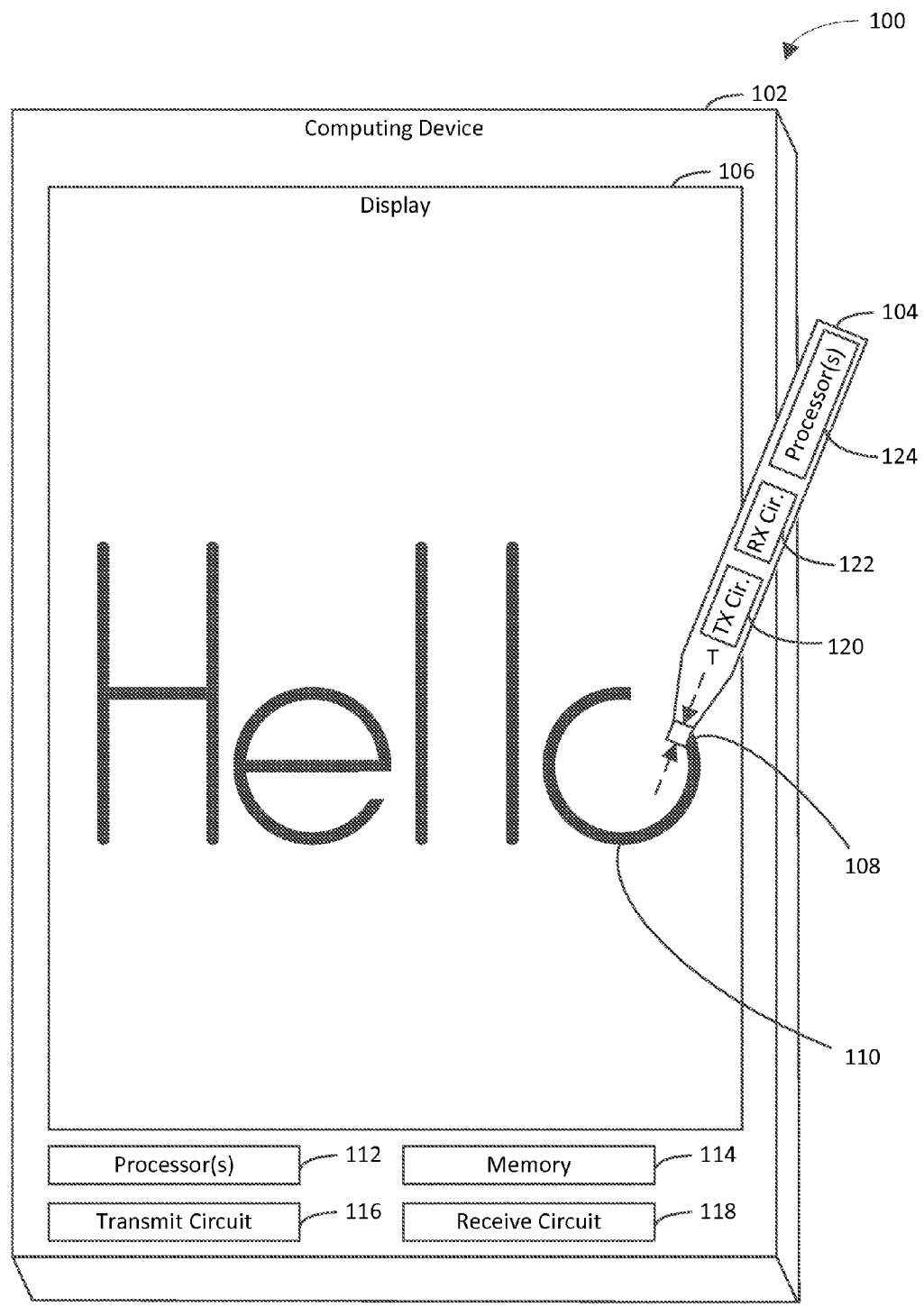
FIG. 1 is a perspective view of an example system that includes a computing device and an input device including a writing electrode having a thickness to facilitate tracking in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example devices described herein include an electrode having a thickness that is capable of facilitating tracking. For example, the thickness of an electrode that is included in a device may be configured to cause a midpoint of a projection of the electrode on a sensor matrix to track a point on the device (or on a portion thereof, such as the electrode) that is closest to the sensor matrix. In another example, the thickness may be configured to cause a location of the electrode that is detected by the sensor matrix to track a point on the device (or on a portion thereof, such as the electrode) that is closest to the sensor matrix. For instance, the location of the electrode that is detected by the sensor matrix may be a centroid of the electrode.

Example devices described herein have a variety of benefits as compared to conventional devices for providing input to a computing device. For instance, an example device may be capable of increasing an accuracy with which a computing device is capable of determining a physical location of the device or a portion thereof (e.g., a point on the device or the portion thereof that is closest to a sensor matrix). The increased accuracy may reduce a difference between the physical location and a detected location of the device that is calculated by the computing device. An electrode having a thickness as described herein may appear more symmetrical to the computing device than a conventional electrode. Including an electrode having a thickness as described herein in a device may eliminate a need for relatively complex and/or costly mechanisms for calculating a tilt of the device.

FIG. 1 is a perspective view of an example system 100 in accordance with an embodiment. The system 100 includes a computing device 102 and an input device 104. The computing device 102 is a processing system that is capable of receiving input from the input device 104. An example of a processing system is a system that includes at least one processor that is capable of manipulating data in accordance with a set of instructions. For instance, a processing system may be a computer (e.g., a tablet computer, a laptop computer, or a desktop computer), or a personal digital assistant.

The computing device 102 includes a display 106, processor(s) 112, a memory 114, a transmit circuit 116, and a receive circuit 118. The display 106 is configured to be a touch screen. Touch and/or hover functionality of the display 106 is enabled by the receive circuit 118, which is capable of sensing objects that are placed proximate the display 106. For example, the receive circuit 118 may sense a location at which an object physically touches the display 106. In accordance with this example, no space is between the object and the display 106. In another example, the receive circuit 118 may sense a location at which an object hovers over the display 106. In accordance with this example, the object and the display 106 are spaced apart and do not touch. The receive circuit 118 receives input from such objects via active or passive signals at locations on the display 106 that correspond to locations of the objects. The display 106 includes pixels having characteristics that are capable of being modified in response to receipt of such input at the locations on the display 106 that correspond to the pixels.

The processor(s) 112 are capable of performing operations based on instructions that are stored in the memory 114 (e.g., in response to receipt of input from the input device 104). For instance, the processor(s) 112 are configured to determine a location of a writing electrode 108, which is included in the input device 104, based on input that is received by the receive circuit 118 from the input device 104. The processor(s) 112 are capable of modifying one or more characteristics of the pixels in the display 106 in response to such input. As shown in FIG. 1, the processor(s) 112 have caused writing 110 to be displayed on the display 106 by changing characteristic(s) of the corresponding pixels in the display 106. More particularly, the processor(s) 112 have caused the word "Hello" to be displayed on the display 106 in response to the writing electrode 108 of the input device 104 tracing the word "Hello" along a path that is proximate the display 106.

The memory 114 stores computer-readable instructions that are executable by the processor(s) 112 to perform operations. The memory 114 may include any suitable type of memory, including but not limited to read only memory (ROM), random access memory (RAM), or flash memory.

The transmit circuit 116 is configured to generate a signal (e.g., a time-varying signal) for transmission to the input device 104. For example, the transmit circuit 116 may transmit the signal to the input device 104 in anticipation of a response from the input device 104. In accordance with this example, if the writing electrode 108 is configured to be a passive slug, the signal that is transmitted by the transmit circuit 116 may be a time-varying voltage, and the response from the input device 104 may be a time-varying current that is generated based on a capacitance between the display 106 and the writing electrode 108. A passive slug is conductive material via which active signals are not transmitted. Rather, passive signals may be transmitted via a passive slug. For instance, the passive slug may respond to signal(s) that are received from the transmit circuit 116 by providing passive signal(s) that are based on the received signal(s).

The input device 104 includes the aforementioned writing electrode 108, a transmit circuit 120, a receive circuit 122, and processor(s) 124. The writing electrode 108 is electrically conductive and has a thickness, T, to facilitate tracking. For instance, the thickness, T, may enable the computing device 102 to more accurately track the writing electrode 108 or a portion thereof (e.g., an edge of the writing electrode 108 that is closest to the display 106) when the input device 104 is tilted from a position that is normal to the display 106. Accordingly, the thickness, T, may be configured to cause the location where writing is displayed on the display 106 to more closely match the intended location of a user of the input device 104 (e.g., when the input device 104 is placed in a traditional writing position). In one example embodiment, the thickness, T, of the writing electrode 108 is configured to cause the perceived location of the writing electrode 108 as determined by the processor(s) 112 (i.e., the detected location of the writing electrode 108) to track a point on the writing electrode that is closest to the display 106. In another example embodiment, the thickness, T, of the writing electrode 108 is configured to cause a midpoint of a projection of the writing electrode 108 on the display 106 to track a point on the writing electrode 108 that is closest to the display 106. Further details regarding some embodiments in which a writing electrode has a thickness to facilitate tracking are provided below with reference to FIGS. 4 and 6.

The transmit circuit 120 is configured to transmit an input to the computing device 102 to cause the processor(s) 112 to determine a location of the writing electrode 108. For example, the transmit circuit 120 may transmit the input to the computing device 102 based on an indication from the processor(s) 124 that the input has been selected to be provided to the computing device 102. In another example, the transmit circuit 120 may generate the input (e.g., without being prompted by the processor(s) 124).

The receive circuit 122 is configured to receive signals that are transmitted by the transmit circuit 116 of the computing device 102. For instance, the receive circuit 122 may forward the signals to the processor(s) 124 for processing.

The processor(s) 124 are configured to process the signals that are received via the receive circuit 122. For instance, the processor(s) 124 may select an input from a plurality of differing inputs to be transmitted to the computing device 102 based on signal(s) that are received from the transmit circuit 116 of the computing device 102.

It will be recognized that the system 100 may not include one or more of the display 106, the processor(s) 112, the memory 114, the transmit circuit 116, the receive circuit 118, the transmit circuit 120, the receive circuit 122, and/or the processor(s) 124. Furthermore, the system 100 may include components in addition to or in lieu of the display 106, the processor(s) 112, the memory 114, the transmit circuit 116, the receive circuit 118, the transmit circuit 120, the receive circuit 122, and/or the processor(s) 124.

Figure 2:
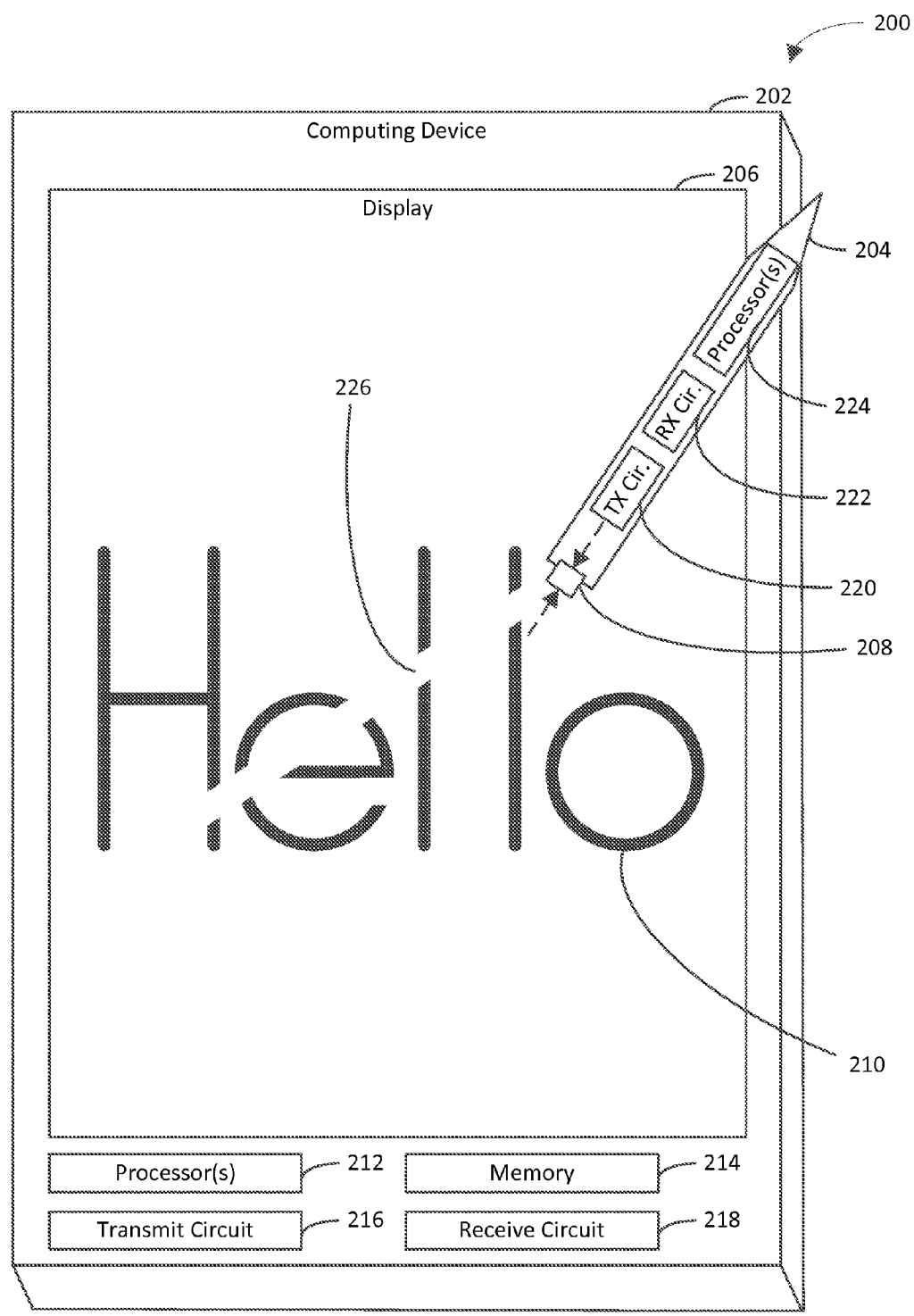
FIG. 2 is a perspective view of an example system that includes a computing device and an input device including an eraser electrode having a thickness to facilitate tracking in accordance with an embodiment.

FIG. 2 is a perspective view of another example system 200 in accordance with an embodiment. System 200 includes a computing device 202 and an input device 204. The computing device 202 is a processing system that is capable of receiving input from the input device 204. The computing device 202 includes a display 206, processor(s) 212, a memory 214, a transmit circuit 216, and a receive circuit 218, which operate in a manner similar to the processor(s) 112, the memory 114, the transmit circuit 116, and the receive circuit 118 described above with reference to FIG. 1.

For instance, the processor(s) 212 are capable of performing operations based on instructions that are stored in the memory 214 (e.g., in response to receipt of input from the input device 204). The processor(s) 212 are configured to determine a location of an eraser electrode 208, which is included in the input device 204, based on input that is received by the receive circuit 218 from the input device 204. The processor(s) 212 are capable of modifying one or more characteristics of the pixels in the display 206 in response to such input. As shown in FIG. 2, the processor(s) 212 have caused a portion of writing 210 to be erased on the display 206 by changing characteristic(s) of the corresponding pixels in the display 206. More particularly, the processor(s) 212 have caused an erasure 226 to remove a portion of the word "Hello" on the display 206 in response to the eraser electrode 208 of the input device 204 being moved along a path that defines the erasure 226 while the eraser electrode 208 is proximate the display 106.

The transmit circuit 216 is configured to generate a signal (e.g., a time-varying signal) for transmission to the input device 204. For example, the transmit circuit 216 may transmit the signal to the input device 204 in anticipation of a response from the input device 204. In accordance with this example, if the eraser electrode 208 is configured to be a passive slug, the signal that is transmitted by the transmit circuit 216 may be a time-varying voltage, and the response from the input device 204 may be a time-varying current that is generated based on a capacitance between the display 206 and the eraser electrode 208.

The input device 204 includes the aforementioned eraser electrode 208, a transmit circuit 220, a receive circuit 222, and processor(s) 224. The eraser electrode 208 is electrically conductive and has a thickness, T, to facilitate tracking. For instance, the thickness, T, may enable the computing device 202 to more accurately track the eraser electrode 208 or a portion thereof (e.g., an edge of the eraser electrode 208 that is closest to the display 206) when the input device 204 is tilted from a position that is normal to the display 206. Accordingly, the thickness, T, may be configured to cause a location at which an erasure occurs on the display 206 to more closely match the location that is intended by a user of the input device 204 (e.g., when the input device 204 is placed in a traditional erasing position). In one example embodiment, the thickness, T, of the eraser electrode 208 is configured to cause the detected location of the eraser electrode 208 to track a point on the eraser electrode 208 that is closest to the display 206. In another example embodiment, the thickness, T, of the eraser electrode 208 is configured to cause a midpoint of a projection of the eraser electrode 208 on the display 206 to track a point on the eraser electrode 208 that is closest to the display 206. Further details regarding some embodiments in which an eraser electrode has a thickness to facilitate tracking are provided below with reference to FIGS. 5-7.

The transmit circuit 220 is configured to transmit an input to the computing device 202 to cause the processor(s) 212 to determine a location of the eraser electrode 208.

It will be recognized that the system 200 may not include one or more of the display 206, the processor(s) 212, the memory 214, the transmit circuit 216, the receive circuit 218, the transmit circuit 220, the receive circuit 222, and/or the processor(s) 224. Furthermore, the system 200 may include components in addition to or in lieu of the display 206, the processor(s) 212, the memory 214, the transmit circuit 216, the receive circuit 218, the transmit circuit 220, the receive circuit 222, and/or the processor(s) 224.

Figure 3:
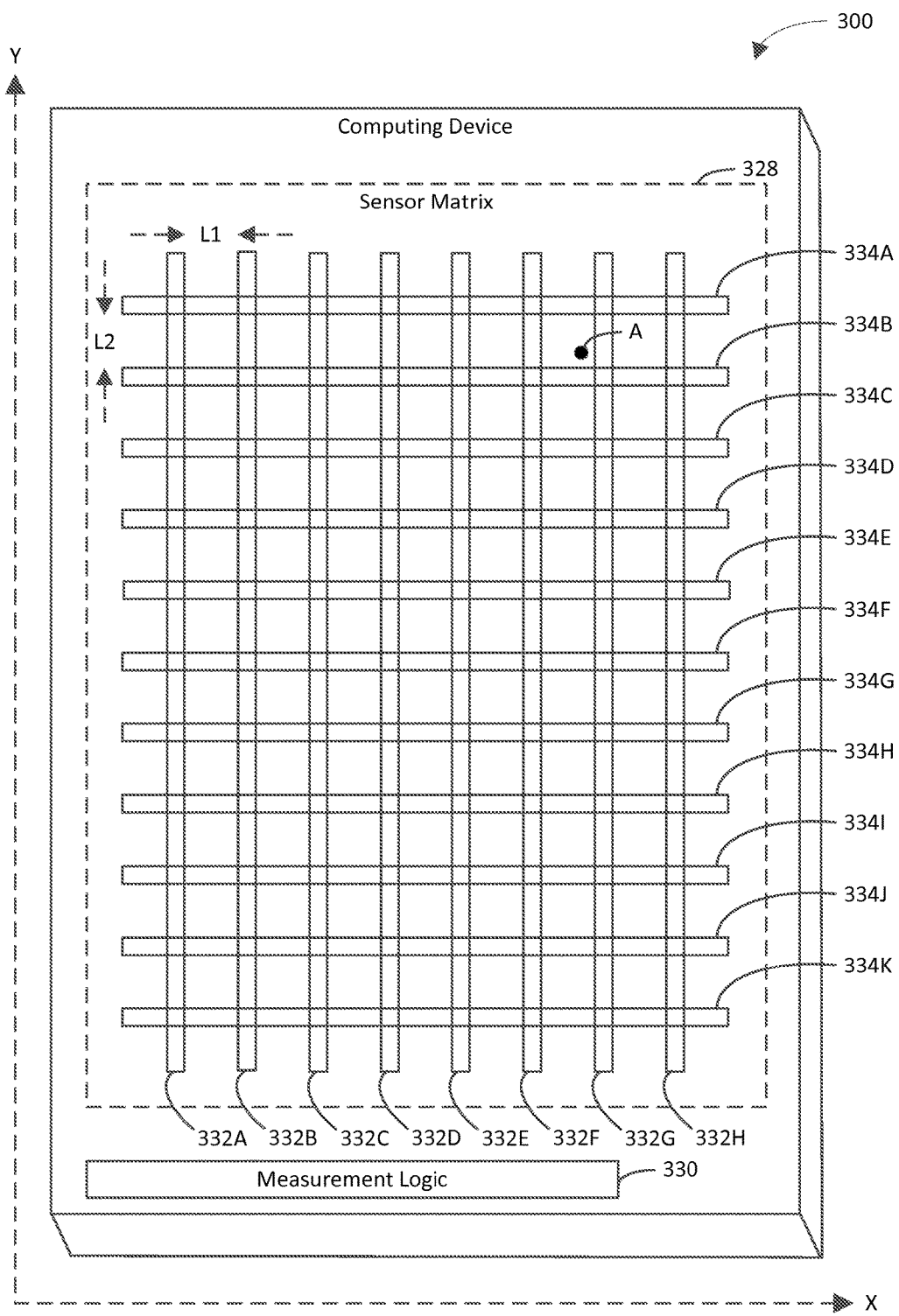
FIG. 3 is a block diagram of an example computing device that includes a sensor matrix in accordance with an embodiment.

FIG. 3 is a block diagram of an example computing device 300 in accordance with an embodiment. The computing device 300 includes a sensor matrix 328 and measurement logic 330. The sensor matrix 328 includes a plurality of column electrodes 332A-332H and a plurality of row electrodes 334A-334K. The plurality of column electrodes 332A-332H are arranged to be substantially parallel with a Y-axis, as shown in FIG. 3. The plurality of row electrodes 334A-334K are arranged to be substantially parallel with an X-axis. The plurality of column electrodes 332A-332H are arranged to be substantially perpendicular to the plurality of row electrodes 334A-334K. A first pitch, L1, between adjacent column electrodes 332A-332H indicates a distance between the midpoints of the adjacent column electrodes 332A-332H. A second pitch, L2, between adjacent row electrodes 334A-334K indicates a distance between the midpoints of the adjacent row electrodes 334A-334K. The first pitch, L1, and the second pitch, L2, may be any suitable values. The first pitch, L1, and the second pitch, L2, may be same or different. For instance, the first pitch, L1, and/or the second pitch, L2, may be approximately 2 mm, 3 mm, 4 mm, or 5 mm.

Placement of an object (e.g., the writing electrode 108 or the eraser electrode 208) proximate a subset (e.g., one or more) of the column electrodes 332A-332H and a subset (e.g., one or more) of the row electrodes 334A-334K causes a change of capacitance to occur between the object and the electrodes in those subsets. For instance, such placement of the object may cause the capacitance to increase from a non-measurable quantity to a measurable quantity. The change of capacitance between the object and each electrode in the subsets may be used to generate a "capacitance map," which may correlate to a shape of the object. For instance, a relatively greater capacitance change may indicate that a distance between the object and the corresponding electrode is relatively small. A relatively lesser capacitance change may indicate that a distance between the object and the corresponding electrode is relatively large. Accordingly, a capacitance map, which indicates capacitance changes associated with respective electrodes in the subsets, may indicate the shape of the object.

In an example embodiment, placement of an object proximate the sensor matrix 328 at point A causes a first capacitance between the object and the row electrode 334A to change, a second capacitance between the object and the row electrode 334B to change, a third capacitance between the object and the column electrode 332F to change, and a fourth capacitance between the object and the column electrode 332G to change. It will be recognized that capacitances between the object and other respective electrodes may change, as well. For instance, the capacitances between the object and those other respective electrodes may change so long as the object is within a designated proximity (3 mm, 5 mm, 7 mm, 10 mm, etc.) to those other electrodes. However, such changes would be less than the changes to the first, second, third, and fourth capacitances mentioned above due to the greater proximity of the object to those other electrodes. Accordingly, the discussion will focus on the first, second, third, and fourth capacitances mentioned above for ease of understanding.

The measurement logic 330 is configured to determine a location of an object that is placed proximate the sensor matrix 328 based on capacitance changes that are sensed by the plurality of column electrodes 332A-332H and the plurality of row electrodes 334A-334K or respective subsets thereof. Accordingly, in the example embodiment mentioned above, the measurement logic 330 determines (e.g., estimates) the location, A, of the object based on the changes to the first, second, third, and fourth capacitances sensed at respective electrodes 334A, 334B, 332F, and 332G. For instance, the measurement logic 330 may estimate (X,Y) coordinates of the location, A.

Determining the location, A, of the object with an accuracy on the order of the first pitch, L1, and/or the second pitch, L2, is relatively straightforward. For instance, a location of a column electrode at which a greatest capacitance change is sensed with respect to the object may indicate (e.g., provide an estimate of) an X coordinate of the location, A. A location of a row electrode at which a greatest capacitance change is sensed with respect to the object may indicate (e.g., provide an estimate of) a Y coordinate of the location, A.

One way to increase the accuracy of the estimate that is determined by the measurement logic 330 is to decrease the first pitch, L1, between adjacent column electrodes 332A-332H and/or the second pitch, L2 between adjacent row electrodes 334A-334K. Another way to increase the accuracy is to interpolate (e.g., as a continuous function) the capacitance changes that are sensed by the plurality of column electrodes 332A-332H and the plurality of row electrodes 334A-334K or respective subsets thereof. For instance, in accordance with the example embodiment mentioned above, the measurement logic 330 interpolates the changes to the first, second, third, and fourth capacitances to determine the location, A.

Figure 4:
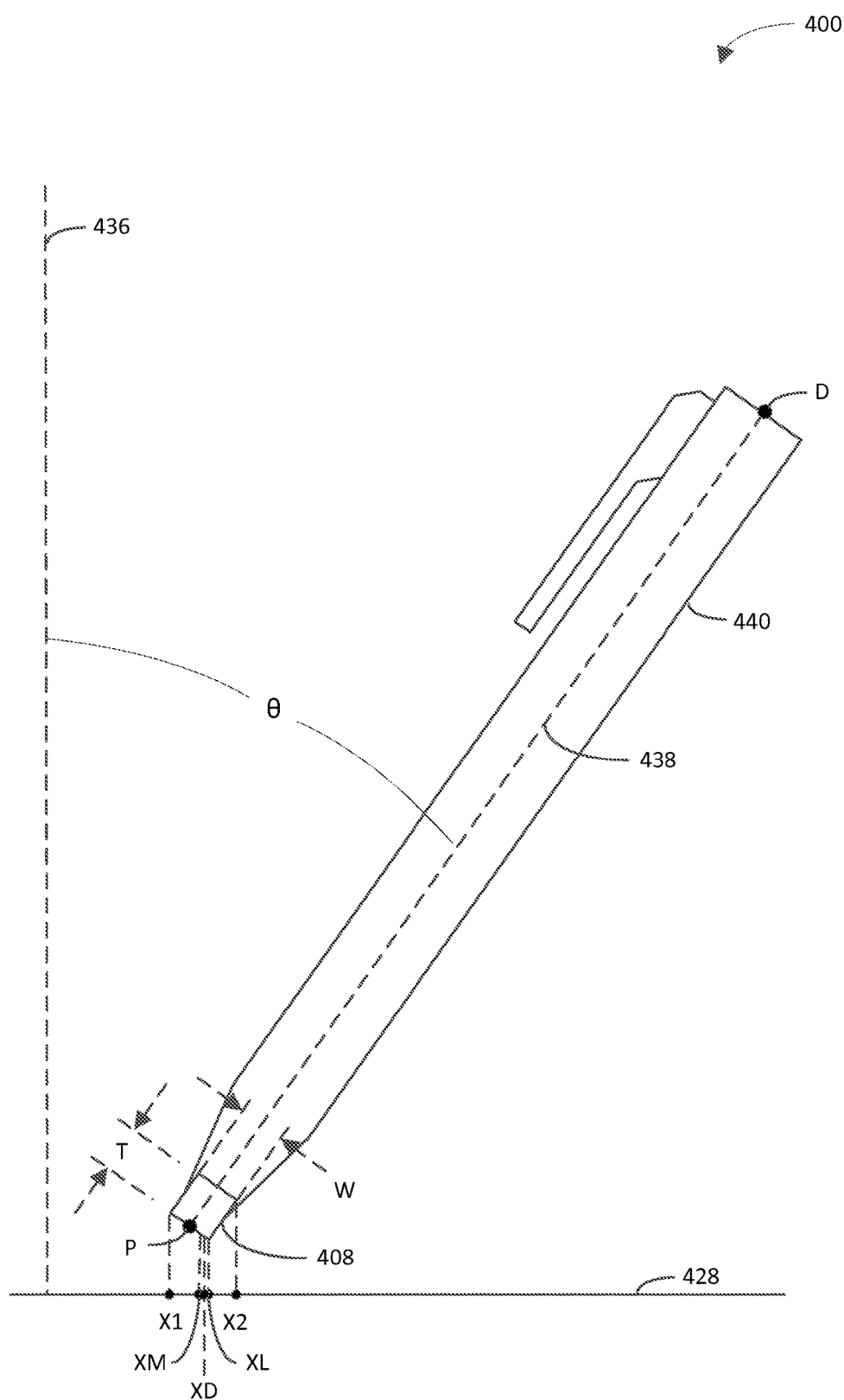
FIG. 4 is a diagram of an example device that includes a writing electrode having a thickness to facilitate tracking in accordance with an embodiment.

FIG. 4 is a diagram of an example device 400 in accordance with an embodiment. The device 400 includes a member 440 and a writing electrode 408. The member 440 has a proximal end, P, and a distal end, D, which are at opposing ends of an axis 438. The member 440 may be a rigid body that contains circuitry for controlling writing functionality of the device 400, though the scope of the example embodiments is not limited in this respect. The member 440 may have a size and/or a shape of a conventional writing pen or a conventional stylus, though the scope of the example embodiments is not limited in this respect. For instance, the member 440 may be approximately 150 mm long and approximately 10 mm in diameter or a different size and/or shape.

The writing electrode 408 is positioned at the proximal end, P, of the member 440. The writing electrode 408 is configured to provide a write signal to a sensor matrix of a computing device in response to the writing electrode 408 being placed proximate the sensor matrix. The sensor matrix is represented by a line 428 for purposes of illustration. The writing electrode 408 has a thickness, T, along the axis 438.

As shown in FIG. 4, an orthogonal axis 436 is orthogonal to the sensor matrix 428. Accordingly, the member 440 is orthogonal to the sensor matrix 428 when an angle, θ, between the orthogonal axis 436 and the axis 438 is zero. The member 440 is non-orthogonal to the sensor matrix 428 when the angle, θ, between the orthogonal axis 436 and the axis 438 is non-zero (e.g., greater than zero or less than zero).

A projection of the writing electrode 408 on the sensor matrix 428 extends along the line 428 between points X1 and X2. A midpoint of the projection of the writing electrode 408 on the sensor matrix 428 is represented by point XM. The midpoint, XM, is equidistant between the points X1 and X2. A point on the writing electrode 408 that is closest to the sensor matrix 428 is represented by point XL.

In a first example embodiment, the thickness, T, of the writing electrode 408 is configured to cause the midpoint, XM, of the projection of the writing electrode 408 on the sensor matrix 428 to track the point, XL, on the writing electrode 408 that is closest to the sensor matrix 428 as the member 440 is rotated from a first position in which the member 440 is orthogonal to the sensor matrix 428 to a second position in which the member 440 is non-orthogonal to the sensor matrix 428. For instance, the midpoint, XM, may track the point, XL, as the member 440 is rotated about a first pivot point, which is defined as a point on the writing electrode 408 that is closest to the sensor matrix 428 when the member 440 is in the first position. It should be noted that the angle, θ, is changing during the rotation of the member 440 from the first position to the second position.

In one aspect of this embodiment, the thickness, T, of writing electrode 408 may cause the midpoint, XM, of the projection to approximately coincide with the point, XL. For example, the thickness, T, may cause the midpoint, XM, to be within a distance from the point, XL, that is a designated percentage of a diameter of the writing electrode 408 in a plane that is perpendicular to the axis 438. In accordance with this example, the thickness, T, may cause the midpoint, XM, to be within a distance from the point, XL, that is 5%, 4%, 3%, or 2% of the diameter of the writing electrode 408. In another aspect of this embodiment, the thickness, T, of the writing electrode 408 may cause the midpoint, XM, of the projection to substantially overlap with the point, XL. In accordance with this aspect, the thickness, T, may cause the midpoint, XM, to be within a distance from the point, XL, that is 1%, 0.5%, or 0.25% of the diameter of the writing electrode 408.

In another aspect of this embodiment, a projection of the first pivot point on the sensor matrix 428 is referred to as a first projected point. The first projected point may be a first distance from the midpoint, XM, of the projection of the writing electrode 408 on the sensor matrix 428. The first projected point may be a second distance from a projection of the point, XL, on the sensor matrix 428. The writing electrode 408 may be configured to cause the first distance to be less than or equal to the second distance. For instance, the thickness, T, of the writing electrode 408 may be configured such that the first distance remains less than or equal to the second distance as the member 440 is rotated (e.g., about the first pivot point) from the first position in which the member 440 is orthogonal to the sensor matrix 428 to the second position in which the member 440 is non-orthogonal to the sensor matrix 428 (e.g., at least up to an angle, θ, of 30 degrees, 45 degrees, 60 degrees, or 75 degrees).

In a second example embodiment, the thickness, T, of the writing electrode 408 is configured to cause a location of the writing electrode 408 that is detected by the sensor matrix 428 (a.k.a. the "detected location"), XD, to track the point, XL, on the writing electrode 408 that is closest to the sensor matrix 428 as member 440 is rotated from a first position in which the member 440 is orthogonal to the sensor matrix 428 to a second position in which the member 440 is non-orthogonal to the sensor matrix 428. For instance, the detected location, XD, may track the point, XL, as the member 440 is rotated about the first pivot point, which is defined as the point on the writing electrode 408 that is closest to the sensor matrix 428 when the member 440 is in the first position.

In one aspect of this embodiment, the thickness, T, of the writing electrode 408 may cause the detected location, XD, to approximately coincide with the point, XL. For example, the thickness, T, may cause the detected location, XD, to be within a distance from the point, XL, that is a designated percentage of a diameter of the writing electrode 408 in a plane that is perpendicular to the axis 438. In accordance with this example, the thickness, T, may cause the detected location, XD, to be within a distance from the point, XL, that is 5%, 4%, 3%, or 2% of the diameter of the writing electrode 408. In another aspect of this embodiment, the thickness, T, of the writing electrode 408 may cause the detected location, XD, to substantially overlap with the point, XL. In accordance with this aspect, the thickness, T, may cause the detected location, XD, to be within a distance from the point, XL, that is 1%, 0.5%, or 0.25% of the diameter of the writing electrode 408.

In another aspect of this embodiment, a projection of the detected location on the sensor matrix 428 is referred to as a projected detected location. The first projected point, which is the projection of the first pivot point on the sensor matrix 428, may be a first distance from the projected detected location. The first projected point may be a second distance from the projection of the point, XL, on the sensor matrix 428. The writing electrode 408 may be configured to cause the first distance to be less than or equal to the second distance. For instance, the thickness, T, of the writing electrode 408 may be configured such that the first distance remains less than or equal to the second distance as the member 440 is rotated (e.g., about the first pivot point) from the first position in which the member 440 is orthogonal to the sensor matrix 428 to the second position in which the member 440 is non-orthogonal to the sensor matrix 428 (e.g., at least up to an angle, θ, of 30 degrees, 45 degrees, 60 degrees, or 75 degrees).

The thickness, T, of the writing electrode 408 may be any suitable thickness. For example, the thickness, T, may be configured to be greater than or equal to 3 mm, greater than or equal to 3.5 mm, greater than or equal to 4 mm, greater than or equal to 5 mm, greater than or equal to 6 mm, or greater than or equal to 7 mm. In another example, the thickness, T, may be configured to be greater than or equal to 30%, 40%, 50%, 60%, 70%, 80%, or 90% of a width, W, of writing electrode 408 in a plane that is perpendicular to the axis 438. In yet another example, the thickness, T, may be approximately equal to the width, W. In accordance with this example, a difference between the thickness, T, and the width, W, may be less than or equal to 10%, 5%, 3%, 2%, 1%, 0.5%, 0.25%, 0.1%, or 0.05% of the width, W. In still another example, the difference between the thickness, T, and the width, W, may be less than or equal to 15%, 20%, 30%, 40%, 50%, or 60% of the width, W. In yet another example, the difference between the thickness, T, and the width, W, may be less than or equal to 0.05 mm, 0.1 mm, 0.15 mm, 0.2 mm, 0.5 mm, 1.0 mm, 2.0 mm, 3.0 mm, 4.0 mm, or 5.0 mm. In another example, the thickness, T, may be less than or equal to the width, W. In yet another example, the thickness, T, may be within a specified percentage (e.g., 5%, 20%, 50%, or 100%) greater than the width, W. In still another example, the thickness, T, may be less than or equal to 105%, 120%, 150%, or 200% of the width, W. The thickness, T, may be selected from a plurality of potential thicknesses to facilitate tracking, though the scope of the example embodiments is not limited in this respect.

The writing electrode 408 may have any suitable shape. For example, the writing electrode 408 may be configured to have a cylindrical shape that extends along the axis 438 and that has a diameter in a plane that is perpendicular to the axis 438. In another example, the writing electrode 408 may be configured to have a hemispherical shape. For instance, the hemispherical shape may cause the writing electrode 408 to appear symmetrical to the sensor matrix 428 regardless of whether the angle, θ, between the orthogonal axis 436 and the axis 438 is zero or non-zero (e.g., greater than or equal to 30 degrees, greater than or equal to 45 degrees, or greater than or equal to 70 degrees). In yet another example, the writing electrode 408 may be configured to have a conical frustum shape. For instance, the conical frustum shape may have a relatively smaller diameter at a first location along the axis 438 and a relatively larger diameter at a second location along the axis 438, where the first location is a first distance from the distal end, D, of the member 440 and the second location is a second distance from the distal end, D, of the member 440. The first distance may be greater than the second distance. In still another example, the writing electrode 408 may be configured to have a mitered edge along a surface of the writing electrode 408 that is farthest from the distal end, D, of the member 440.

In yet another example, a cross-sectional area of the writing electrode 408 increases from a first cross-sectional area in a first plane that is perpendicular to the axis 438 and that includes a first point on the axis 438 to a second cross-sectional area in a second plane that is perpendicular to the axis 438 and that includes a second point on the axis 438. In accordance with this example, the first point is a first distance from the distal end, D, of the member 440, and the second point is a second distance from the distal end, D, of the member 440. In further accordance with this example, the first distance is greater than the second distance.

Figure 5:
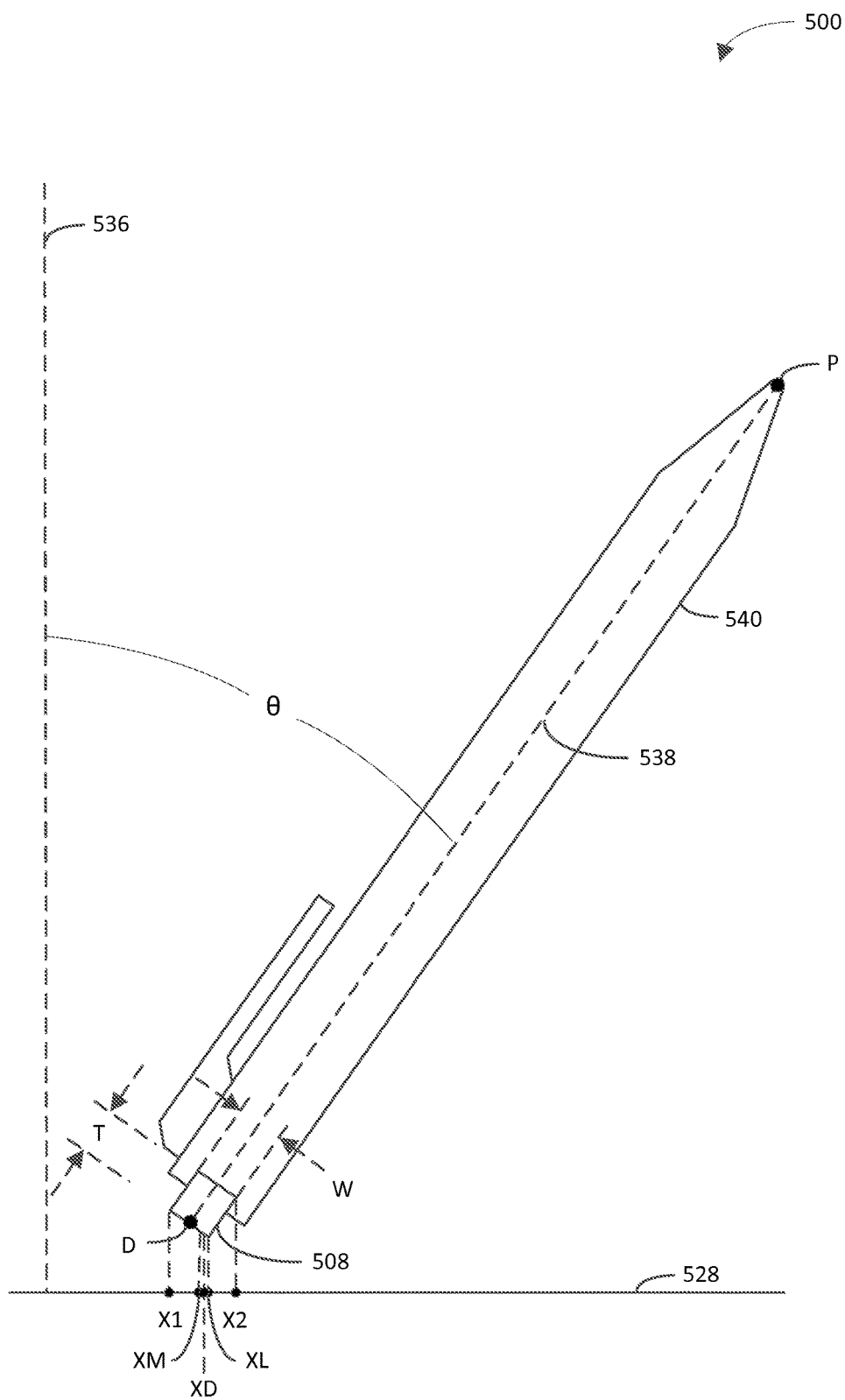
FIG. 5 is a diagram of an example device that includes an eraser electrode having a thickness to facilitate tracking in accordance with an embodiment.

FIG. 5 is a diagram of another example device 500 in accordance with an embodiment. The device 500 includes a member 540 and an eraser electrode 508. The member 540 has a proximal end, P, and a distal end, D, which are at opposing ends of an axis 538. The member 540 may be a rigid body that contains circuitry for controlling erasing functionality of the device 500, though the scope of the example embodiments is not limited in this respect. The member 540 may have a size and/or a shape of a conventional writing pen or a conventional mechanical eraser, though the scope of the example embodiments is not limited in this respect. For instance, the member 540 may be approximately 150 mm long and approximately 10 mm in diameter or a different size and/or shape.

The eraser electrode 508 is positioned at the distal end, D, of the member 540. The eraser electrode 508 is configured to provide an erase signal to a sensor matrix of a computing device in response to the eraser electrode 508 being placed proximate the sensor matrix. The sensor matrix is represented by a line 528 for purposes of illustration. The eraser electrode 508 has a thickness, T, along the axis 538.

As shown in FIG. 5, an orthogonal axis 536 is orthogonal to the sensor matrix 528. Accordingly, the member 540 is orthogonal to the sensor matrix 528 when an angle, θ, between the orthogonal axis 536 and the axis 538 is zero. The member 540 is non-orthogonal to the sensor matrix 528 when the angle, θ, between the orthogonal axis 536 and the axis 538 is non-zero (e.g., greater than zero or less than zero).

A projection of the eraser electrode 508 on the sensor matrix 528 extends along the line 528 between points X1 and X2. A midpoint of the projection of the eraser electrode 508 on the sensor matrix 528 is represented by point XM. The midpoint, XM, is equidistant between the points X1 and X2. A point on the eraser electrode 508 that is closest to the sensor matrix 528 is represented by point XL.

In a first example embodiment, the thickness, T, of the eraser electrode 508 is configured to cause the midpoint, XM, of the projection of the eraser electrode 508 on the sensor matrix 528 to track the point, XL, on the eraser electrode 508 that is closest to the sensor matrix 528 as member 540 is rotated from a first position in which the member 540 is orthogonal to the sensor matrix 528 to a second position in which the member 540 is non-orthogonal to the sensor matrix 528. For instance, the midpoint, XM, may track the point, XL, as the member 540 is rotated about a second pivot point, which is defined as a point on the eraser electrode 508 that is closest to the sensor matrix 528 when the member 540 is in the first position. It should be noted that the angle, θ, is changing during the rotation of the member 540 from the first position to the second position.

In one aspect of this embodiment, the thickness, T, of the eraser electrode 508 may cause the midpoint, XM, of the projection to approximately coincide with the point, XL. For example, the thickness, T, may cause the midpoint, XM, to be within a distance from the point, XL, that is a designated percentage of a diameter of the eraser electrode 508 in a plane that is perpendicular to the axis 538. In accordance with this example, the thickness, T, may cause the midpoint, XM, to be within a distance from the point, XL, that is 5%, 4%, 3%, or 2% of the diameter of the eraser electrode 508. In another aspect of this embodiment, the thickness, T, of the eraser electrode 508 may cause the midpoint, XM, of the projection to substantially overlap with the point, XL. In accordance with this aspect, the thickness, T, may cause the midpoint, XM, to be within a distance from the point, XL, that is 1%, 0.5%, or 0.25% of the diameter of the eraser electrode 508.

In another aspect of this embodiment, a projection of the second pivot point, which is defined as the point on the eraser electrode 508 that is closest to the sensor matrix 528 when the member 540 is in the first position, on the sensor matrix 528 is referred to as a second projected point. The second projected point may be a first distance from the midpoint, XM, of the projection of the eraser electrode 508 on the sensor matrix 528. The second projected point may be a second distance from a projection of the point, XL, on the sensor matrix 528. The eraser electrode 508 may be configured to cause the first distance to be less than or equal to the second distance. For instance, the thickness, T, of the eraser electrode 508 may be configured such that the first distance remains less than or equal to the second distance as the member 540 is rotated (e.g., about the second pivot point) from the first position in which the member 540 is orthogonal to the sensor matrix 528 to the second position in which the member 540 is non-orthogonal to the sensor matrix 528 (e.g., at least up to an angle, θ, of 30 degrees, 45 degrees, 60 degrees, or 75 degrees).

In a second example embodiment, the thickness, T, of the eraser electrode 508 is configured to cause a location of the eraser electrode 508 that is detected by the sensor matrix 528 (a.k.a. the "detected location"), XD, to track the point, XL, on the eraser electrode 508 that is closest to the sensor matrix 528 as the member 540 is rotated from a first position in which the member 540 is orthogonal to the sensor matrix 528 to a second position in which the member 540 is non-orthogonal to the sensor matrix 528. For instance, the detected location, XD, may track the point, XL, as the member 540 is rotated about the second pivot point, which is defined as the point on the eraser electrode 508 that is closest to the sensor matrix 528 when the member 540 is in the first position.

In one aspect of this embodiment, the thickness, T, of the eraser electrode 508 may cause the detected location, XD, to approximately coincide with the point, XL. For example, the thickness, T, may cause the detected location, XD, to be within a distance from the point, XL, that is a designated percentage of a diameter of the eraser electrode 508 in a plane that is perpendicular to the axis 538. In accordance with this example, the thickness, T, may cause the detected location, XD, to be within a distance from the point, XL, that is 5%, 4%, 3%, or 2% of the diameter of the eraser electrode 508. In another aspect of this embodiment, the thickness, T, of the eraser electrode 508 may cause the detected location, XD, to substantially overlap with the point, XL. In accordance with this aspect, the thickness, T, may cause the detected location, XD, to be within a distance from the point, XL, that is 1%, 0.5%, or 0.25% of the diameter of the eraser electrode 508.

In another aspect of this embodiment, a projection of the detected location on the sensor matrix 528 is referred to as a projected detected location. The second projected point, which is the projection of the second pivot point on the sensor matrix 528, may be a first distance from the projected detected location. The second projected point may be a second distance from the projection of the point, XL, on the sensor matrix 528. The eraser electrode 508 may be configured to cause the first distance to be less than or equal to the second distance. For instance, the thickness, T, of the eraser electrode 508 may be configured such that the first distance remains less than or equal to the second distance as the member 540 is rotated (e.g., about the second pivot point) from the first position in which the member 540 is orthogonal to the sensor matrix 528 to the second position in which the member 540 is non-orthogonal to the sensor matrix 528 (e.g., at least up to an angle, θ, of 30 degrees, 45 degrees, 60 degrees, or 75 degrees).

The thickness, T, of the eraser electrode 508 may be any suitable thickness. For example, the thickness, T, may be configured to be greater than or equal to 3 mm, greater than or equal to 3.5 mm, greater than or equal to 4 mm, greater than or equal to 5 mm, greater than or equal to 6 mm, or greater than or equal to 7 mm. In another example, the thickness, T, may be configured to be greater than or equal to 30%, 40%, 50%, 60%, 70%, 80%, or 90% of a width, W, of the eraser electrode 508 in a plane that is perpendicular to the axis 538. In yet another example, the thickness, T, may be approximately equal to the width, W. In accordance with this example, a difference between the thickness, T, and the width, W, may be less than or equal to 10%, 5%, 3%, 2%, 1%, 0.5%, 0.25%, 0.1%, or 0.05% of the width, W. In still another example, the difference between the thickness, T, and the width, W, may be less than or equal to 15%, 20%, 30%, 40%, 50%, or 60% of the width, W. In yet another example, the difference between the thickness, T, and the width, W, may be less than or equal to 0.05 mm, 0.1 mm, 0.15 mm, 0.2 mm, 0.5 mm, 1.0 mm, 2.0 mm, 3.0 mm, 4.0 mm, or 5.0 mm. In another example, the thickness, T, may be less than or equal to the width, W. In yet another example, the thickness, T, may be within a specified percentage (e.g., 5%, 20%, 50%, or 100%) greater than the width, W. In still another example, the thickness, T, may be less than or equal to 105%, 120%, 150%, or 200% of the width, W. The thickness, T, may be selected from a plurality of potential thicknesses to facilitate tracking, though the scope of the example embodiments is not limited in this respect.

The eraser electrode 508 may have any suitable shape. For example, the eraser electrode 508 may be configured to have a cylindrical shape that extends along the axis 538 and that has a diameter in a plane that is perpendicular to the axis 538. In another example, the eraser electrode 508 may be configured to have a hemispherical shape. For instance, the hemispherical shape may cause the eraser electrode 508 to appear symmetrical to the sensor matrix 528 regardless of whether the angle, θ, between the orthogonal axis 536 and the axis 538 is zero or non-zero (e.g., greater than or equal to 30 degrees, greater than or equal to 45 degrees, or greater than or equal to 70 degrees). In yet another example, the eraser electrode 508 may be configured to have a conical frustum shape. For instance, the conical frustum shape may have a relatively smaller diameter at a first location along the axis 538 and a relatively larger diameter at a second location along the axis 538, where the first location is a first distance from the proximal end, P, of the member 540 and the second location is a second distance from the proximal end, P, of the member 540. The first distance may be greater than the second distance. In still another example, the eraser electrode 508 may be configured to have a mitered edge along a surface of the eraser electrode 508 that is farthest from the proximal end, P, of the member 540.

In yet another example, a cross-sectional area of the eraser electrode 508 increases from a first cross-sectional area in a first plane that is perpendicular to the axis 538 and that includes a first point on the axis 538 to a second cross-sectional area in a second plane that is perpendicular to the axis 538 and that includes a second point on the axis 538. In accordance with this example, the first point is a first distance from the proximal end, P, of the member 540, and the second point is a second distance from the proximal end, P, of the member 540. In further accordance with this example, the first distance is greater than the second distance.

Figure 6:
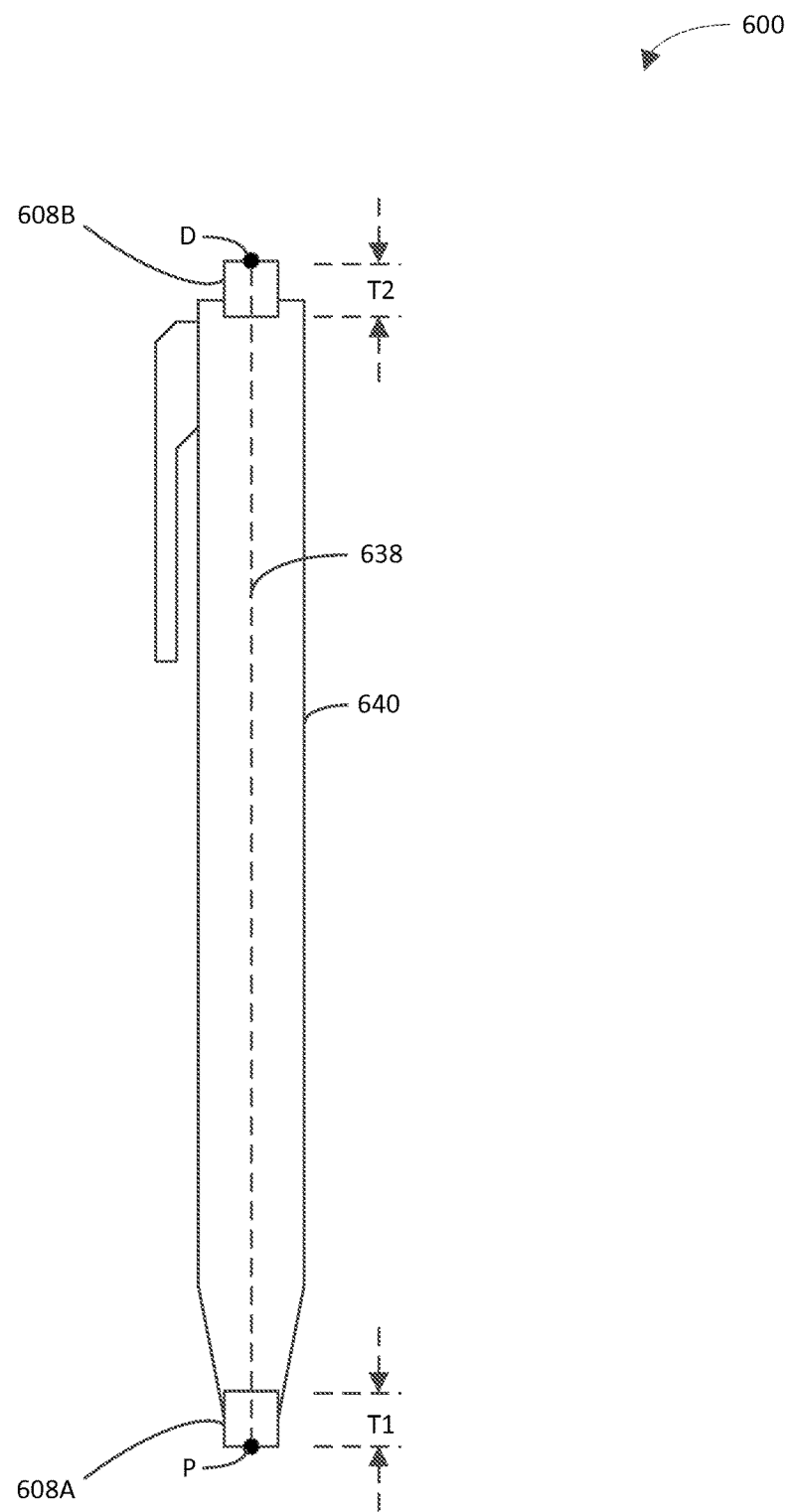
FIG. 6 is a diagram of an example device that includes a writing electrode having a first thickness and an eraser electrode having a second thickness to facilitate tracking in accordance with an embodiment.

FIG. 6 is a diagram of yet another example device 600 in accordance with an embodiment. The device 600 includes a member 640, a writing electrode 608A, and an eraser electrode 608B. The member 640 has a proximal end, P, and a distal end, D, which are at opposing ends of an axis 638. The member 640 may be a rigid body that contains circuitry for controlling writing functionality and erasing functionality of the device 600, though the scope of the example embodiments is not limited in this respect.

The writing electrode 608A is positioned at the proximal end, P, of the member 640. The writing electrode 608A has a first thickness, T1, along the axis 638. The writing electrode 608A is configured to provide a write signal to a sensor matrix of a computing device in response to the writing electrode 608A being placed proximate the sensor matrix.

The eraser electrode 608B is positioned at the distal end, D, of the member 640. The eraser electrode 608B has a second thickness, T2, along the axis 538. The eraser electrode 608B is configured to provide an erase signal to the sensor matrix in response to the eraser electrode 608B being placed proximate the sensor matrix.

Figure 7:
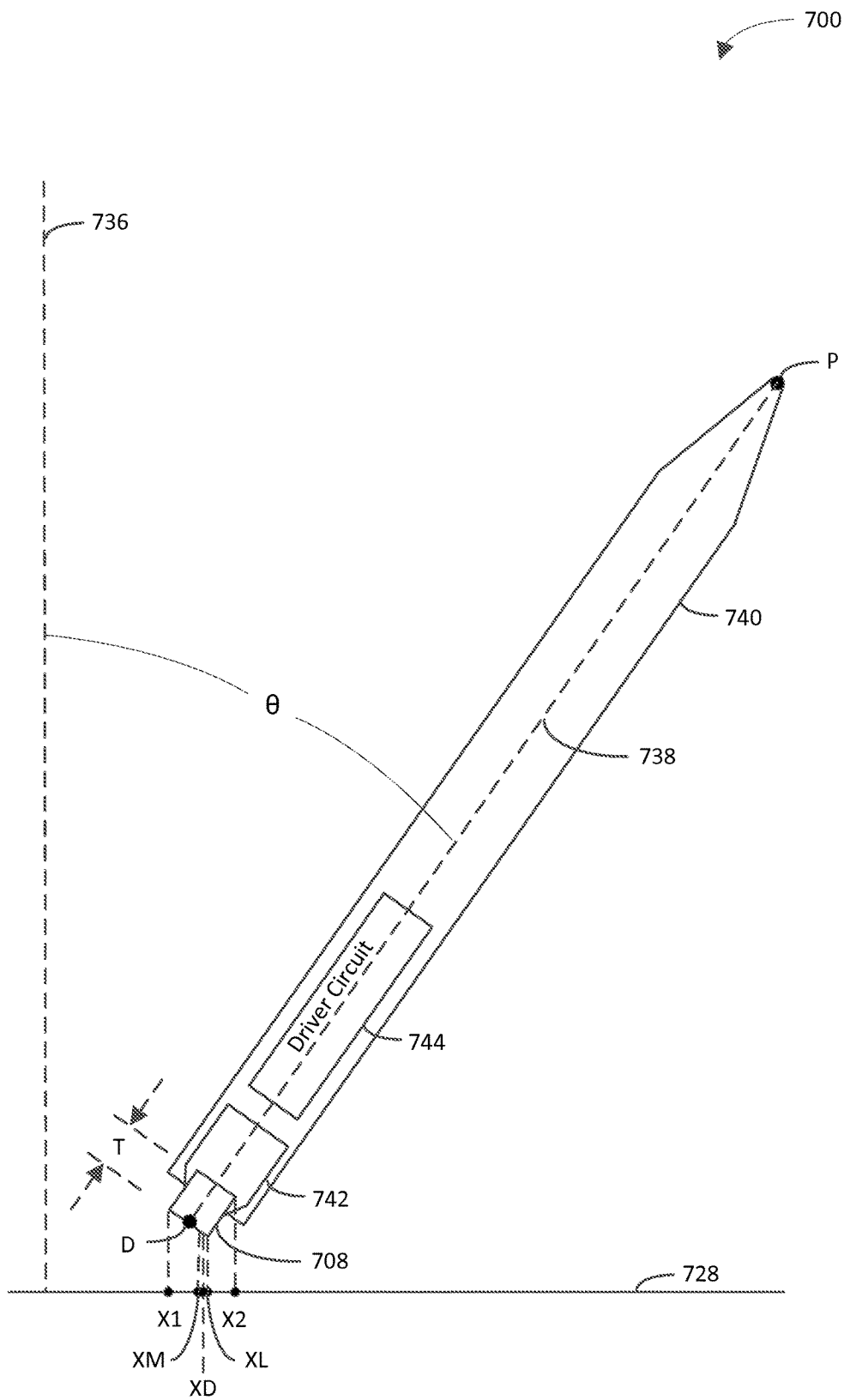
FIG. 7 is diagram of another example device that includes an eraser electrode having a thickness to facilitate tracking in accordance with an embodiment.

FIG. 7 is a diagram of still another example device 700 in accordance with an embodiment. The device 700 includes an elongated member 740, a module 742, and a driver circuit 744. The elongated member 740 extends along an axis 738. The elongated member 740 may at least partially surround the module 742 and the driver circuit 744, as shown in FIG. 7, though the example embodiments are not limited in this respect. The driver circuit 744 is configured to generate an active signal. For instance, the driver circuit 744 may drive the active signal for transmission from the device 700 while the device 700 is capacitively coupled to a sensor matrix of a computing device, which is represented by line 728. The module 742, which is coupled to an end of the elongated member 740, includes an electrode 708 that is configured to provide the active signal electrostatically to the sensor matrix 728. For instance, the electrode 708 may provide the active signal in response to the electrode 708 being placed proximate the sensor matrix 728. The electrode 708 has a thickness, T, along the axis 738.

In FIG. 7, the device 700 is shown to have an eraser configuration for illustrative purposes. In the eraser configuration, the module 742 is coupled to a distal end, D, of the elongated member 740, and the electrode 708 is an eraser electrode. In the eraser configuration, the active signal is an erase signal. Accordingly, the driver circuit 744 may be configured to generate the active signal to initiate an erasure operation with respect to content displayed by the computing device. The electrode 708 may be configured to provide the active signal electrostatically in accordance with the erasure operation. For example, the erasure operation may be configured to cause an erasure to occur at a location on a display of the computing device that corresponds to a location of the module 742 or the electrode 708 that is detected by the sensor matrix 728. In another example, the erasure operation may be configured to cause an erasure to occur at a location on the display of the computing device that corresponds to a point on the elongated member 740 that is closest to the sensor matrix 728.

It will be recognized that the device 700 may have a writing configuration, rather than an eraser configuration. In the writing configuration, the module 742 is coupled to a proximal end, P, of the elongated member 740, rather than the distal end, D. In the writing configuration, the electrode 708 is a writing electrode, and the active signal is a write signal. Accordingly, the driver circuit 744 may be configured to generate the active signal to initiate a write operation to provide writing on a display of the computing device. The electrode 708 may be configured to provide the active signal electrostatically in accordance with the write operation. For example, the write operation may be configured to cause writing to occur at a location on the display of the computing device that corresponds to the location of the module 742 or the electrode 708 that is detected by the sensor matrix 728. In another example, the write operation may be configured to cause writing to occur at a location on the display of the computing device that corresponds to the point on the elongated member 740 that is closest to the sensor matrix 728.

As shown in FIG. 7, an orthogonal axis 736 is orthogonal to the sensor matrix 728, which is represented by the line 728. Accordingly, the member 740 is orthogonal to the sensor matrix 28 when an angle, θ, between the orthogonal axis 736 and the axis 738 is zero. The member 740 is non-orthogonal to the sensor matrix 728 when the angle, θ, between the orthogonal axis 736 and the axis 738 is non-zero (e.g., greater than zero or less than zero).

A projection of the electrode 708 on the sensor matrix 728 extends along the line 728 between points X1 and X2. A midpoint of the projection of the electrode 708 on the sensor matrix 728 is represented by point XM. The midpoint, XM, is equidistant between the points X1 and X2. A point on the electrode 708 that is closest to the sensor matrix 728 is represented by point XL.

In a first example implementation of the device 700, the thickness, T, of the electrode 708 is configured to cause the midpoint, XM, of the projection of the electrode 708 on the sensor matrix 728 to track the point, XL, on the electrode 708 that is closest to the sensor matrix 728 as the elongated member 740 is rotated from a first position in which the elongated member 740 is orthogonal to the sensor matrix 728 to a second position in which the elongated member 740 is non-orthogonal to the sensor matrix 728. For instance, the midpoint, XM, may track the point, XL, as the elongated member 740 is rotated about a third pivot point, which is defined as a point on the electrode 708 that is closest to the sensor matrix 728 when the elongated member 740 is in the first position. It should be noted that the angle, θ, is changing during the rotation of the elongated member 740 from the first position to the second position.

In one aspect of this implementation, the thickness, T, of the electrode 708 may cause the midpoint, XM, of the projection to approximately coincide with the point, XL. For example, the thickness, T, may cause the midpoint, XM, to be within a distance from the point, XL, that is a designated percentage of a diameter of the electrode 708 in a plane that is perpendicular to the axis 738. In accordance with this example, the thickness, T, may cause the midpoint, XM, to be within a distance from the point, XL, that is 5%, 4%, 3%, or 2% of the diameter of electrode 708. In another aspect of this embodiment, the thickness, T, of the electrode 708 may cause the midpoint, XM, of the projection to substantially overlap with the point, XL. In accordance with this aspect, the thickness, T, may cause the midpoint, XM, to be within a distance from the point, XL, that is 1%, 0.5%, or 0.25% of the diameter of the electrode 708.

In another aspect of this embodiment, a projection of the third pivot point, which is defined as the point on the electrode 708 that is closest to the sensor matrix 728 when the elongated member 740 is in the first position, on the sensor matrix 728 is referred to as a third projected point. The third projected point may be a first distance from the midpoint, XM, of the projection of the electrode 708 on the sensor matrix 728. The third projected point may be a second distance from a projection of the point, XL, on the sensor matrix 728. The electrode 708 may be configured to cause the first distance to be less than or equal to the second distance. For instance, the thickness, T, of the electrode 708 may be configured such that the first distance remains less than or equal to the second distance as the elongated member 740 is rotated (e.g., about the third pivot point) from the first position in which the elongated member 740 is orthogonal to the sensor matrix 728 to the second position in which the elongated member 740 is non-orthogonal to the sensor matrix 728 (e.g., at least up to an angle, θ, of 30 degrees, 45 degrees, 60 degrees, or 75 degrees).

In a second example implementation of the device 700, the thickness, T, of the electrode 708 is configured to cause a location of the module 742 or the electrode 708 that is detected by the sensor matrix 728 (a.k.a. the "detected location"), XD, to track the point, XL, on the electrode 708 that is closest to the sensor matrix 728 as the elongated member 740 is rotated from a first position in which the elongated member 708 is orthogonal to the sensor matrix 728 to a second position in which the elongated member 708 is non-orthogonal to the sensor matrix 728. For instance, the detected location, XD, may track the point, XL, as the elongated member 740 is rotated about the third pivot point, which is defined as the point on the electrode 708 that is closest to the sensor matrix 728 when the elongated member 740 is in the first position.

In one aspect of this implementation, the thickness, T, of the electrode 708 may cause the detected location, XD, to approximately coincide with the point, XL. For example, the thickness, T, may cause the detected location, XD, to be within a distance from the point, XL, that is a designated percentage of a diameter of the electrode 708 in a plane that is perpendicular to the axis 738. In accordance with this example, the thickness, T, may cause the detected location, XD, to be within a distance from the point, XL, that is 5%, 4%, 3%, or 2% of the diameter of the electrode 708. In another aspect of this embodiment, the thickness, T, of the electrode 708 may cause the detected location, XD, to substantially overlap with the point, XL. In accordance with this aspect, the thickness, T, may cause the detected location, XD, to be within a distance from the point, XL, that is 1%, 0.5%, or 0.25% of the diameter of the electrode 708.

In another aspect of this embodiment, a projection of the detected location on the sensor matrix 728 is referred to as a projected detected location. The third projected point, which is the projection of the third pivot point on the sensor matrix 728, may be a first distance from the projected detected location. The third projected point may be a second distance from the projection of the point, XL, on the sensor matrix 728. The electrode 708 may be configured to cause the first distance to be less than or equal to the second distance. For instance, the thickness, T, of the electrode 708 may be configured such that the first distance remains less than or equal to the second distance as the elongated member 740 is rotated (e.g., about the third pivot point) from the first position in which the elongated member 740 is orthogonal to the sensor matrix 728 to the second position in which the elongated member 740 is non-orthogonal to the sensor matrix 728 (e.g., at least up to an angle, θ, of 30 degrees, 45 degrees, 60 degrees, or 75 degrees).

The thickness, T, of the electrode 708 may be any suitable thickness, and the electrode 708 may have any suitable shape, as described above with reference to the writing electrode 408 and the eraser electrode 508 in respective FIGS. 4 and 5.

Any one or more of the devices 104, 204, 400, 500, 600, and/or 700 may be implemented as an electrostatic pen. Any one or more of the devices 104, 204, 400, 500, and/or 600 may be implemented as a passive pen.

III. Further Discussion of Some Example Embodiments

A first example device includes a member, a first electrode, and a second electrode. The member has a proximal end and a distal end at opposing ends of an axis. The first electrode is positioned at the proximal end. The first electrode is configured to provide a write signal to a sensor matrix of a computing device in response to the first electrode being placed proximate the sensor matrix. The second electrode is positioned at the distal end. The second electrode is configured to provide an erase signal to the sensor matrix of the computing device in response to the second electrode being placed proximate the sensor matrix. The second electrode has a thickness along the axis. The thickness is configured to cause a midpoint of a projection of the second electrode on the sensor matrix to track a point on the second electrode that is closest to the sensor matrix as the member is rotated from a first position in which the member is orthogonal to the sensor matrix to a second position in which the member is non-orthogonal to the sensor matrix.

In a first aspect of the first example device, the first example device further comprises a driver circuit configured to generate the erase signal. In accordance with the first aspect, the erase signal is an active signal. In further accordance with the first aspect, the second electrode is configured to provide the erase signal electrostatically to the sensor matrix in response to the second electrode being placed proximate the sensor matrix.

In a second aspect of the first example device, the thickness is configured to cause the midpoint of the projection to track the point on the second electrode that is closest to the sensor matrix as the member is rotated about a pivot point from the first position to the second position. In accordance with the second aspect, the pivot point is defined as a point on the second electrode that is closest to the sensor matrix when the member is in the first position. The second aspect of the first example device may be implemented in combination with the first aspect of the first example device, though the example embodiments are not limited in this respect.

In a third aspect of the first example device, the thickness is configured to be approximately equal to a width of the second electrode in a plane that is perpendicular to the axis. The third aspect of the first example device may be implemented in combination with the first and/or second aspect of the first example device, though the example embodiments are not limited in this respect.

In a fourth aspect of the first example device, the thickness is configured to be greater than or equal to three millimeters. The fourth aspect of the first example device may be implemented in combination with the first, second, and/or third aspect of the first example device, though the example embodiments are not limited in this respect.

In a fifth aspect of the first example device, a cross-sectional area of the second electrode increases from a first cross-sectional area in a first plane that is perpendicular to the axis and that includes a first point on the axis to a second cross-sectional area in a second plane that is perpendicular to the axis and that includes a second point on the axis. In accordance with the fifth aspect, the first point is a first distance from the proximal end. In further accordance with the fifth aspect, the second point is a second distance from the proximal end. In further accordance with the fifth aspect, the first distance is greater than the second distance. The fifth aspect of the first example device may be implemented in combination with the first, second, third, and/or fourth aspect of the first example device, though the example embodiments are not limited in this respect.

In a sixth aspect of the first example device, the thickness is configured to cause the midpoint of the projection of the second electrode on the sensor matrix to track the point on the second electrode that is closest to the sensor matrix as the member is rotated about a pivot point from the first position to the second position. In accordance with the sixth aspect, the pivot point is defined to be a point on the second electrode that is closest to the sensor matrix when the member is in the first position. In further accordance with the sixth aspect, a projection of the pivot point on the sensor matrix is a first distance from the midpoint of the projection of the second electrode on the sensor matrix. In further accordance with the sixth aspect, the projection of the pivot point on the sensor matrix is a second distance from the point on the second electrode that is closest to the sensor matrix. In further accordance with the sixth aspect, the thickness is configured to cause the first distance to remain less than or equal to the second distance as the member is rotated about the pivot point from the first position to the second position. The sixth aspect of the first example device may be implemented in combination with the first, second, third, fourth, and/or fifth aspect of the first example device, though the example embodiments are not limited in this respect.

In a seventh aspect of the first example device, the second electrode is configured to have a shape of a conical frustum. The seventh aspect of the first example device may be implemented in combination with the first, second, third, fourth, fifth, and/or sixth aspect of the first example device, though the example embodiments are not limited in this respect.

In an eighth aspect of the first example device, the second electrode is configured to be a passive slug. The eighth aspect of the first example device may be implemented in combination with the first, second, third, fourth, fifth, sixth, and/or seventh aspect of the first example device, though the example embodiments are not limited in this respect.

A second example device includes a member and an electrode. The member has a proximal end and a distal end at opposing ends of an axis. The electrode is positioned at a designated end of the member. The designated end is the proximal end or the distal end. The electrode is configured to provide a signal to a sensor matrix of a computing device in response to the electrode being placed proximate the sensor matrix. The electrode has a thickness along the axis. The thickness is configured to cause a location of the electrode that is detected by the sensor matrix to track a point on the electrode that is closest to the sensor matrix as the member is rotated from a first position in which the member is orthogonal to the sensor matrix to a second position in which the member is non-orthogonal to the sensor matrix.

In a first aspect of the second example device, the second example device further includes a driver circuit configured to generate the signal. In accordance with the first aspect, the signal is an active signal. In further accordance with the first aspect, the electrode is configured to provide the signal electrostatically to the sensor matrix in response to the electrode being placed proximate the sensor matrix.

In a second aspect of the second example device, the electrode is configured to be a passive slug. The second aspect of the second example device may be implemented in combination with the first aspect of the second example device, though the example embodiments are not limited in this respect.

In a third aspect of the second example device, the thickness is configured to be approximately equal to a width of the electrode in a plane that is perpendicular to the axis. The third aspect of the second example device may be implemented in combination with the first and/or second aspect of the second example device, though the example embodiments are not limited in this respect.

In a fourth aspect of the second example device, the thickness is configured to be greater than or equal to thirty percent of a width of the electrode in a plane that is perpendicular to the axis. The fourth aspect of the second example device may be implemented in combination with the first, second, and/or third aspect of the second example device, though the example embodiments are not limited in this respect.

In a fifth aspect of the second example device, the electrode is configured to have a shape of a hemisphere. The fifth aspect of the second example device may be implemented in combination with the first, second, third, and/or fourth aspect of the second example device, though the example embodiments are not limited in this respect.

In a sixth aspect of the second example device, a cross-sectional area of the electrode increases from a first cross-sectional area in a first plane that is perpendicular to the axis and that includes a first point on the axis to a second cross-sectional area in a second plane that is perpendicular to the axis and that includes a second point on the axis. In accordance with the sixth aspect, the first point is a first distance from a specified end of the member. In further accordance with the sixth aspect, the specified end is the proximal end or the distal end that is not the designated end. In further accordance with the sixth aspect, the second point is a second distance from the specified end. In further accordance with the sixth aspect, the first distance is greater than the second distance. The sixth aspect of the second example device may be implemented in combination with the first, second, third, fourth, and/or fifth aspect of the second example device, though the example embodiments are not limited in this respect.

In a seventh aspect of the second example device, the electrode is configured to have a shape of a conical frustum. The seventh aspect of the second example device may be implemented in combination with the first, second, third, fourth, fifth, and/or sixth aspect of the second example device, though the example embodiments are not limited in this respect.

In an eighth aspect of the second example device, the thickness is configured to cause the location of the electrode that is detected by the sensor matrix to track the point on the electrode that is closest to the sensor matrix as the member is rotated about a pivot point from the first position to the second position. In accordance with the eighth aspect, the pivot point is defined as a point on the electrode that is closest to the sensor matrix when the member is in the first position. The eighth aspect of the second example device may be implemented in combination with the first, second, third, fourth, fifth, sixth, and/or seventh aspect of the second example device, though the example embodiments are not limited in this respect.

In a ninth aspect of the second example device, the thickness is configured to cause the location of the electrode that is detected by the sensor matrix to track the point on the electrode that is closest to the sensor matrix as the member is rotated about a pivot point from the first position to the second position. In accordance with the ninth aspect, the pivot point is defined to be a point on the electrode that is closest to the sensor matrix when the member is in the first position. In further accordance with the ninth aspect, a projection of the pivot point on the sensor matrix is a first distance from a projection of the location of the electrode that is detected by the sensor matrix on the sensor matrix. In further accordance with the ninth aspect, the projection of the pivot point on the sensor matrix is a second distance from the point on the electrode that is closest to the sensor matrix. In further accordance with the ninth aspect, the thickness is configured to cause the first distance to remain less than or equal to the second distance as the member is rotated about the pivot point from the first position to the second position. The ninth aspect of the second example device may be implemented in combination with the first, second, third, fourth, fifth, sixth, seventh, and/or eighth aspect of the second example device, though the example embodiments are not limited in this respect.

A third example device includes an elongated member, a driver circuit, and a module. The elongated member extends along an axis. The driver circuit is configured to generate an active signal. The module is coupled to an end of the elongated member. The module includes an electrode that is configured to provide the active signal electrostatically to a sensor matrix of a computing device. The electrode has a thickness along the axis. The thickness is configured to cause a midpoint of a projection of the electrode on the sensor matrix to track a point on the electrode that is closest to the sensor matrix as the elongated member is rotated from a first position in which the elongated member is orthogonal to the sensor matrix to a second position in which the elongated member is non-orthogonal to the sensor matrix.

In a first aspect of the third example device, the thickness is configured to be approximately equal to a width of the electrode in a plane that is perpendicular to the axis.

In a second aspect of the third example device, the thickness is configured to be greater than or equal to fifty percent of a width of the electrode in a plane that is perpendicular to the axis. The second aspect of the third example device may be implemented in combination with the first aspect of the third example device, though the example embodiments are not limited in this respect.

In a third aspect of the third example device, the elongated member extends along the axis between the end to which the module is coupled and a second end. In accordance with the third aspect, a cross-sectional area of the electrode increases from a first cross-sectional area in a first plane that is perpendicular to the axis and that includes a first point on the axis to a second cross-sectional area in a second plane that is perpendicular to the axis and that includes a second point on the axis. In further accordance with the third aspect, the first point is a first distance from the second end of the elongated member. In further accordance with the third aspect, the second point is a second distance from the second end of the elongated member. In further accordance with the third aspect, the first distance is greater than the second distance. The third aspect of the third example device may be implemented in combination with the first and/or second aspect of the third example device, though the example embodiments are not limited in this respect.

In a fourth aspect of the third example device, the driver circuit is configured to generate the active signal to initiate an erasure operation with respect to content displayed by the computing device. In accordance with the fourth aspect, the electrode is configured to provide the active signal electrostatically in accordance with the erasure operation. The fourth aspect of the third example device may be implemented in combination with the first, second, and/or third aspect of the third example device, though the example embodiments are not limited in this respect.

In a fifth aspect of the third example device, the driver circuit is configured to generate the active signal to initiate a write operation to provide writing on a display of the computing device. In accordance with the fifth aspect, the electrode is configured to provide the active signal electrostatically in accordance with the write operation. The fifth aspect of the third example device may be implemented in combination with the first, second, third, and/or fourth aspect of the third example device, though the example embodiments are not limited in this respect.

In a sixth aspect of the third example device, the thickness is configured to cause the midpoint of the projection to track the point on the electrode that is closest to the sensor matrix as the elongated member is rotated about a pivot point from the first position to the second position. In accordance with the sixth aspect, the pivot point is defined as a point on the electrode that is closest to the sensor matrix when the elongated member is in the first position. The sixth aspect of the third example device may be implemented in combination with the first, second, third, fourth, and/or fifth aspect of the third example device, though the example embodiments are not limited in this respect.

In a seventh aspect of the third example device, the electrode is configured to have a shape of a hemisphere. The seventh aspect of the third example device may be implemented in combination with the first, second, third, fourth, fifth, and/or sixth aspect of the third example device, though the example embodiments are not limited in this respect.

In an eighth aspect of the third example device, the electrode is configured to have a shape of a conical frustum. The eighth aspect of the third example device may be implemented in combination with the first, second, third, fourth, fifth, sixth, and/or seventh aspect of the third example device, though the example embodiments are not limited in this respect.

In a ninth aspect of the third example device, the thickness is configured to cause the midpoint of the projection of the electrode on the sensor matrix to track the point on the electrode that is closest to the sensor matrix as the elongated member is rotated about a pivot point from the first position to the second position. In accordance with the ninth aspect, the pivot point is defined to be a point on the electrode that is closest to the sensor matrix when the elongated member is in the first position. In further accordance with the ninth aspect, a projection of the pivot point on the sensor matrix is a first distance from the midpoint of the projection of the electrode on the sensor matrix. In further accordance with the ninth aspect, the projection of the pivot point on the sensor matrix is a second distance from the point on the electrode that is closest to the sensor matrix. In further accordance with the ninth aspect, the thickness is configured to cause the first distance to remain less than or equal to the second distance as the elongated member is rotated about the pivot point from the first position to the second position. The ninth aspect of the third example device may be implemented in combination with the first, second, third, fourth, fifth, sixth, seventh, and/or eighth aspect of the third example device, though the example embodiments are not limited in this respect.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:
1. A device comprising:
 a member having a proximal end and a distal end at opposing ends of an axis;
 a first electrode positioned at the proximal end, the first electrode configured to provide a write signal to a sensor matrix of a computing device in response to the first electrode being placed proximate the sensor matrix; and a second electrode positioned at the distal end, the second electrode configured to provide an erase signal to the sensor matrix of the computing device in response to the second electrode being placed proximate the sensor matrix, the second electrode having a thickness along the axis, the thickness configured to cause a midpoint of a projection of the second electrode on the sensor matrix to track a point on the second electrode that is closest to the sensor matrix as the member is rotated about a pivot point from a first position in which the member is orthogonal to the sensor matrix to a second position in which the member is non-orthogonal to the sensor matrix, the pivot point defined to be a point on the second electrode that is closest to the sensor matrix when the member is in the first position, a projection of the pivot point on the sensor matrix being a first distance from the midpoint of the projection of the second electrode on the sensor matrix, the projection of the pivot point on the sensor matrix being a second distance from the point on the second electrode that is closest to the sensor matrix, the thickness configured to cause the first distance to remain less than or equal to the second distance as the member is rotated about the pivot point from the first position to the second position.

2. The device of claim 1, further comprising:
a driver circuit configured to generate the erase signal;
wherein the erase signal is an active signal; and
wherein the second electrode is configured to provide the erase signal electrostatically to the sensor matrix in response to the second electrode being placed proximate the sensor matrix.

3. The device of claim 1, wherein the thickness is configured to be approximately equal to a width of the second electrode in a plane that is perpendicular to the axis.

4. The device of claim 1, wherein the thickness is configured to be greater than or equal to three millimeters.

5. The device of claim 1, wherein a cross-sectional area of the second electrode increases from a first cross-sectional area in a first plane that is perpendicular to the axis and that includes a first point on the axis to a second cross-sectional area in a second plane that is perpendicular to the axis and that includes a second point on the axis;
wherein the first point is a first distance from the proximal end;
wherein the second point is a second distance from the proximal end; and
wherein the first distance is greater than the second distance.

6. The device of claim 1, wherein the thickness is configured to cause the midpoint of the projection of the second electrode on the sensor matrix to track the point on the second electrode that is closest to the sensor matrix as the member is rotated about the pivot point from the first position to the second position at least up to an angle of thirty degrees.

7. A device comprising:
a member having a proximal end and a distal end at opposing ends of an axis; and
an electrode positioned at a designated end of the member, the designated end being the proximal end or the distal end, the electrode configured to provide a signal to a sensor matrix of a computing device in response to the electrode being placed proximate the sensor matrix, the electrode having a thickness along the axis, the thickness configured to cause a location of the electrode that is detected by the sensor matrix to track a point on the electrode that is closest to the sensor matrix as the member is rotated about a pivot point from a first position in which the member is orthogonal to the sensor matrix to a second position in which the member is non-orthogonal to the sensor matrix, the pivot point defined to be a point on the electrode that is closest to the sensor matrix when the member is in the first position, a projection of the pivot point on the sensor matrix being a first distance from a projection of the location of the electrode that is detected by the sensor matrix on the sensor matrix, the projection of the pivot point on the sensor matrix being a second distance from the point on the electrode that is closest to the sensor matrix, the thickness configured to cause the first distance to remain less than or equal to the second distance as the member is rotated about the pivot point from the first position to the second position.

8. The device of claim 7, further comprising:
a driver circuit configured to generate the signal;
wherein the signal is an active signal; and
wherein the electrode is configured to provide the signal electrostatically to the sensor matrix in response to the electrode being placed proximate the sensor matrix.

9. The device of claim 7, wherein the electrode is configured to be a passive slug.

10. The device of claim 7, wherein the thickness is configured to be approximately equal to a width of the electrode in a plane that is perpendicular to the axis.

11. The device of claim 7, wherein the thickness is configured to be greater than or equal to thirty percent of a width of the electrode in a plane that is perpendicular to the axis.

12. The device of claim 7, wherein a cross-sectional area of the electrode increases from a first cross-sectional area in a first plane that is perpendicular to the axis and that includes a first point on the axis to a second cross-sectional area in a second plane that is perpendicular to the axis and that includes a second point on the axis;
wherein the first point is a first distance from a specified end of the member, the specified end being the proximal end or the distal end that is not the designated end;
wherein the second point is a second distance from the specified end; and
wherein the first distance is greater than the second distance.

13. The device of claim 12, wherein the electrode is configured to have a shape of a conical frustum.

14. The device of claim 7, wherein the thickness is configured to cause the location of the electrode that is detected by the sensor matrix to track the point on the electrode that is closest to the sensor matrix as the member is rotated about the pivot point from the first position to the second position at least up to an angle of thirty degrees.

15. A device comprising:
a member that extends along an axis; and
a module coupled to an end of the member, the module including an electrode that is configured to provide a signal to a sensor matrix of a computing device, the electrode having a thickness along the axis, the thickness configured to cause a midpoint of a projection of the electrode on the sensor matrix to track a point on the electrode that is closest to the sensor matrix as the member is rotated about a pivot point from a first position in which the member is orthogonal to the sensor matrix to a second position in which the member is non-orthogonal to the sensor matrix, the pivot point defined to be a point on the electrode that is closest to the sensor matrix when the member is in the first position, a projection of the pivot point on the sensor matrix being a first distance from the midpoint of the projection of the electrode on the sensor matrix, the projection of the pivot point on the sensor matrix being a second distance from the point on the electrode that is closest to the sensor matrix, the thickness configured to cause the first distance to remain less than or equal to the second distance as the member is rotated about the pivot point from the first position to the second position.

16. The device of claim 15, wherein the thickness is configured to be approximately equal to a width of the electrode in a plane that is perpendicular to the axis.

17. The device of claim 15, wherein the thickness is configured to be greater than or equal to fifty percent of a width of the electrode in a plane that is perpendicular to the axis.

18. The device of claim 15, wherein the member extends along the axis between the end to which the module is coupled and a second end;

wherein a cross-sectional area of the electrode increases from a first cross-sectional area in a first plane that is perpendicular to the axis and that includes a first point on the axis to a second cross-sectional area in a second plane that is perpendicular to the axis and that includes a second point on the axis;

wherein the first point is a first distance from the second end of the member;

wherein the second point is a second distance from the second end of the member; and wherein the first distance is greater than the second distance.

19. The device of claim 15, wherein the signal is an active signal;

wherein the device further comprises:
a driver circuit configured to generate the active signal to initiate an erasure operation with respect to content displayed by the computing device; and wherein the electrode is configured to provide the active signal electrostatically in accordance with the erasure operation.

20. The device of claim 15, wherein the signal is an active signal;

wherein the device further comprises:
a driver circuit configured to generate the active signal to initiate a write operation to provide writing on a display of the computing device; and wherein the electrode is configured to provide the active signal electrostatically in accordance with the write operation.

* * * * *